US010798229B2

(12) United States Patent
Roulon et al.

(10) Patent No.: US 10,798,229 B2
(45) Date of Patent: Oct. 6, 2020

(54) METHOD FOR TRANSMITTING A DATA MESSAGE TO AN ELECTRONIC RECEIVING DEVICE, RELATED ELECTRONIC TRANSMITTING DEVICE AND COMPUTER PROGRAM

(71) Applicant: THALES, Courbevoie (FR)

(72) Inventors: Stéphane Roulon, Merignac (FR); Ludovic Billault, Merignac (FR); Isabelle Todescato, Merignac (FR); Jean-Jérôme Vengeon, Merignac (FR)

(73) Assignee: THALES, Courbevoie (FR)

( * ) Notice: Subject to any disclaimer, the term of this patent is extended or adjusted under 35 U.S.C. 154(b) by 115 days.

(21) Appl. No.: 16/195,088

(22) Filed: Nov. 19, 2018

(65) Prior Publication Data

US 2019/0158637 A1 May 23, 2019

(30) Foreign Application Priority Data

Nov. 21, 2017 (FR) ...................................... 17 01211

(51) Int. Cl.
*H04L 12/46* (2006.01)
*H04L 12/40* (2006.01)
*H04L 29/08* (2006.01)

(52) U.S. Cl.
CPC ............ *H04L 69/324* (2013.01); *H04L 12/46* (2013.01); *H04L 12/4633* (2013.01); *H04L 2012/4028* (2013.01)

(58) Field of Classification Search
None
See application file for complete search history.

(56) References Cited

U.S. PATENT DOCUMENTS

| | | | | |
|---|---|---|---|---|
| 2005/0190760 A1* | 9/2005 | Scherer | ................. | H04L 12/413 370/389 |
| 2012/0105637 A1* | 5/2012 | Yousefi | ................. | H04N 7/183 348/148 |
| 2014/0313943 A1* | 10/2014 | Lopez | ................. | H04L 12/4641 370/276 |
| 2016/0043947 A1* | 2/2016 | Nickel | ................... | H04L 69/22 370/392 |
| 2016/0121816 A1* | 5/2016 | Koo | .................... | H04L 12/4013 370/476 |

(Continued)

OTHER PUBLICATIONS

Search report for FR 1701211, dated Jun. 5, 2018.

*Primary Examiner* — Ajit Patel
(74) *Attorney, Agent, or Firm* — Duane Morris LLP

(57) ABSTRACT

The message transmission method for transmitting a data message to at least one electronic receiving device, is implemented by a transmitting device. The transmitting device and the one or more receiving device(s) are connected via an avionics network, with the transmitting device and/or the receiving device being an avionics device. The transmission method includes the generation of a message, the message comprising a message header and one or more data packet(s); and the transmission of the message to the one or more receiving device(s). Each packet comprises one or more data cluster(s), each cluster containing an identifier field, a size field and a payload data field, and each cluster is adapted to include one or more other data cluster(s), the one or more other data cluster(s) thus then forming the payload data field of said cluster.

11 Claims, 3 Drawing Sheets

(56) References Cited

U.S. PATENT DOCUMENTS

2016/0182687 A1   6/2016   Coulmeau et al.
2016/0249254 A1   8/2016   Giloh et al.
2017/0093596 A1*   3/2017   Wandel ................ H04L 12/413
2019/0385057 A1*   12/2019   Litichever ........... H04L 63/1416

* cited by examiner

METHOD FOR TRANSMITTING A DATA MESSAGE TO AN ELECTRONIC RECEIVING DEVICE, RELATED ELECTRONIC TRANSMITTING DEVICE AND COMPUTER PROGRAM

CROSS-REFERENCE TO RELATED APPLICATIONS

This application is a U.S. non-provisional application claiming the benefit of French Application No. 17 01211, filed on Nov. 21, 2017, which is incorporated herein by reference in its entirety.

FIELD

The present invention relates to a transmission method for transmitting a data message to at least one electronic receiving device, the method being implemented by an electronic transmitting device, the transmitting device and the one or more receiving device(s) being connected via an avionics network on board an aircraft, at least one device from the transmitting device and the receiving device being an avionics device on board the aircraft.

The transmission method includes the generation of a data message, the message comprising a message header and one or more data packet(s), and the transmission of the generated message to the receiving device.

The present invention also relates to a non-transitory computer-readable medium including a computer program that comprises the software instructions which, when executed by a computer, implement such a transmission method.

The present invention also relates to an electronic transmitting device configured to transmit a data message to one or more electronic receiving devices, the transmitting device and the one or more receiving device(s) being able to be connected via an avionics network on board an aircraft, at least one device from the transmitting device and the receiving device being an avionics device intended to be installed on board the aircraft.

The present invention relates to the field of data communication and functional interfacing through an avionics network between two electronic devices, of which at least one device being intended to be installed on board an aircraft. An electronic device is for example a functional server, that is configured to implement a function, such as an avionics function, such as a system for managing the flight or FMS (Flight Management System), a system for radio management or RMS (Radio Management System), a ground-terrain warning system or TAWS (Terrain Awareness and Warning System), a meteorological radar system, an AIS receiver (Avionics Interface Systems), or even a mission preparation system, and the other electronic device is for example a display system, such as a display system within the cockpit or CDS (Cockpit Display System) or a head-up display device or HUD (Head-Up Display), or an electronic flight bag or EFB (Electronic Flight Bag), or indeed another functional server, the other device thus then being a server that implements another function. The invention thus relates for example to a data exchange between a flight management system or FMS and a radio management system or RMS.

BACKGROUND

The most widely used communications networks for interfacing current aircraft systems are communications networks that are compliant with the ARINC 429 (Aeronautical Radio INC.) protocol that offers low bandwidth, with a throughput of up to 100 kbit/s, and communications networks that are compliant with Part 7 of the ARINC 664 protocol that are switched networks with a throughput of up to 100 Mbit/s.

Communication networks that comply with the ARINC 661 protocol or the ARINC 739 protocol are also known. These ARINC 661 and ARINC 739 protocols make it possible to support the interface between a functional avionics system and a display system. With the ARINC 661 protocol, the exchanges are carried out on graphic objects that are hosted in the display system and controlled by the functional avionics system. The ARINC 661 protocol makes it possible to significantly limit the volume of data exchanged because only the data required at a given instant are provided by the functional avionics system. With the ARINC 739 protocol, the information exchanged are keypad entries and characters to be displayed.

However, these protocols are not adapted to efficiently manage data exchanges, in particular functional exchanges, between all the avionics systems of which at least one is installed on board the aircraft, these exchanges being characterized mainly by a large number of different data and numerous occurrences.

SUMMARY

The object of the invention is thus to provide a transmission method and an associated electronic transmitting device, which make it possible to more easily adapt to the different types of data to be exchanged on board the aircraft.

To this end, the subject-matter of the invention is a transmission method for transmitting a data message to at least one electronic receiving device, the method being implemented by an electronic transmitting device, the transmitting device and the one or more receiving device(s) being connected via an avionics network on board an aircraft, at least one device from the transmitting device and the receiving device being an avionics device on board the aircraft, the method including:
  the generation of a data message, the message comprising a message header and one or more data packet(s); and
  the transmission of the generated message to the one or more receiving device(s);
  each packet comprising one or more data cluster(s), each cluster containing an identifier field, a size field and a payload data field, and each cluster being adapted to include one or more other data cluster(s), the one or more other data cluster(s) thus then forming the payload data field of said cluster.

With the transmission method according to the invention, the structuring of the messages sent in data clusters, with each cluster containing an identifier field, a size field and a payload data field, and each cluster being adapted to include one or more other data cluster(s), the one or more other data cluster(s) thus then forming the payload data field of said cluster, provides for the scalability of the data transmission. The transmission method according to the invention also makes it possible to limit the bandwidth used by transmitting only the necessary clusters. Each data cluster corresponds to a functional information item, and the structuring of the information item is determined by the transmitting device.

According to other advantageous aspects of the invention, the transmission method includes one or more of the following characteristic features, taken into consideration individually or in accordance with any technically possible combinations:

- to each cluster is associated one single avionics functional domain;
- each avionics functional domain preferably corresponding to an ATA chapter or an ATA sub-chapter;
- when the avionics functional domain is identical for the set of the cluster(s) included in the message, the message header comprises a functional domain field containing an identifier of the avionics functional domain;
- when the avionics functional domain is not identical for the set of the cluster(s) included in the message, the identifier field of each cluster contains an identifier of the avionics functional domain associated to said cluster;
- each cluster is identified in a unique manner for all of the electronic devices connected to the avionics network, the identifier field of each cluster preferably having an identical structure from one cluster to another;
- the message header includes a transmitter identification field containing an identifier of the transmitting device which is unique for all of the electronic devices connected to the avionics network;
- the message header includes a receiver identification field containing an identifier of the receiving device which is unique for all of the electronic devices connected to the avionics network; and
- each packet includes a packet header and a packet body, with each packet body then comprising the one or more data cluster(s), each packet presenting a type chosen from among the group consisting of: request packet, response packet, and publish packet.

The subject-matter of the invention is also a non-transitory computer-readable medium including a computer program that comprises the software instructions which, when executed by a computer, implement a transmission method as defined here above.

The subject-matter of the invention is also an electronic transmitting device configured to transmit a data message to at least one electronic receiving device, the transmitting device and the one or more receiving device(s) being able to be connected via an avionics network on board an aircraft, at least one device from the transmitting device and the receiving device being an avionics device intended to be installed on board the aircraft, the electronic transmitting device comprising:

- a generation module configured to generate a data message, the message comprising a message header and one or more data packet(s); and
- a transmission module configured to transmit the generated message to the one or more receiving device(s);

each packet comprising one or more data cluster(s), each cluster containing an identifier field, a size field, and a payload data field and each cluster being adapted to include one or more other data cluster(s), the one or more other data cluster(s) thus then forming the payload data field of said cluster.

BRIEF DESCRIPTION OF THE DRAWINGS

These features and advantages of the invention will become more clearly apparent upon reading the description which follows, provided solely by way of non-limiting example, and with reference being made to the accompanying drawings, in which.

DETAILED DESCRIPTION

Figure 1:
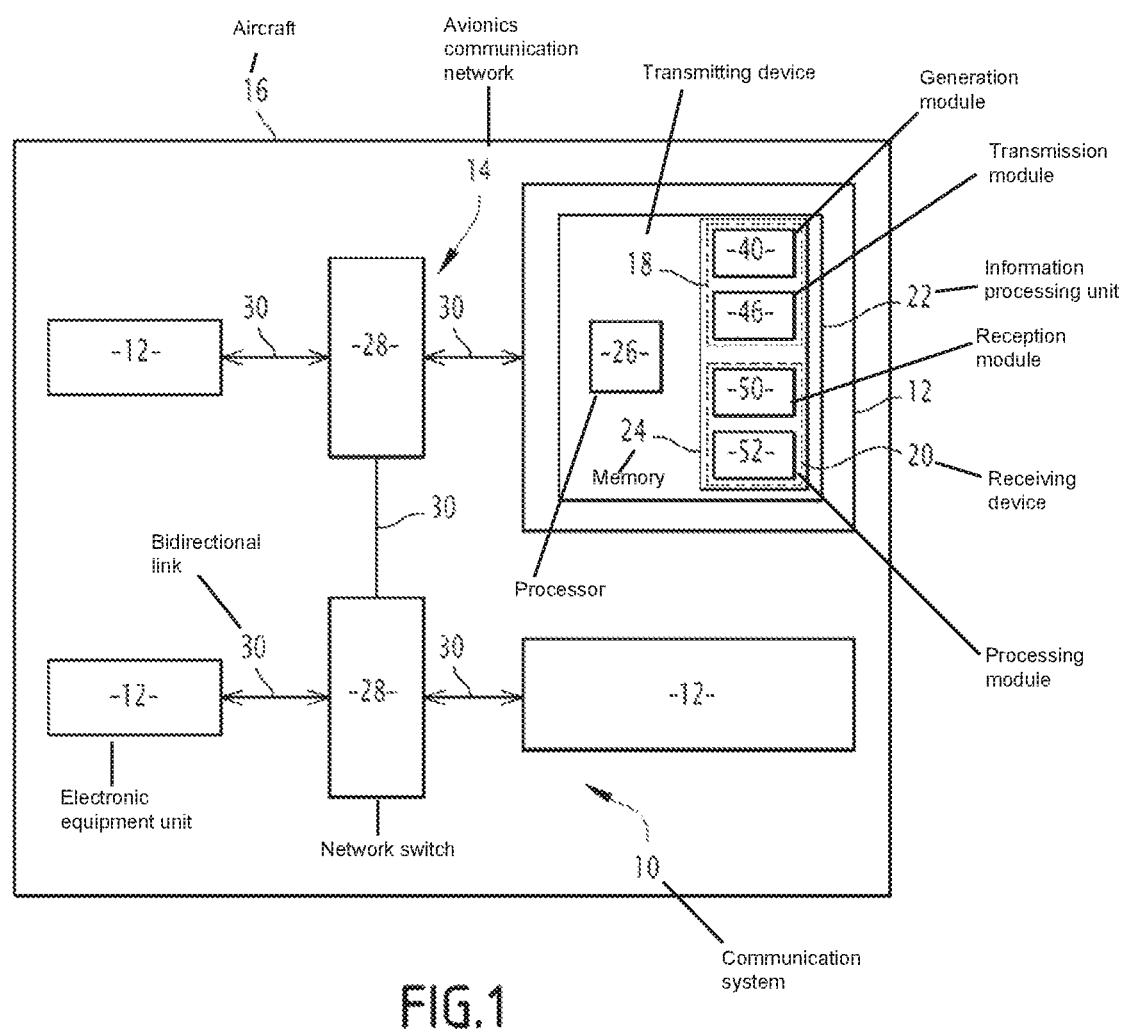
FIG. 1 is a schematic representation of a communication system comprising at least two electronic equipment units that are connected to each other by means of an avionics communication network, with at least one of the electronic equipment units comprising an electronic transmitting device according to the invention.

In FIG. 1, a communication system 10 comprises at least two electronic equipment units 12 that are connected to each other by means of an avionics communication network 14, such as an Ethernet communication network. At least one of the electronic equipment units 12 and the avionics communication network 14 are installed on board an aircraft 16. The aircraft 16 is preferably an airplane. By way of a variant, the aircraft 16 is a helicopter, or even a drone piloted remotely by a pilot.

The communication system 10 comprises a plurality of electronic equipment units 12, such as avionics equipment units as shown in the example of FIG. 1, where the communication system 10 is installed on board the aircraft 16.

The communication system 10 comprises an electronic transmitting device 18 and at least one electronic receiving device 20 that are connected to each other by means of the avionics communication network 14. At least one device from among the transmitting device 18 and the one or more receiving device(s) 20 is an avionics device installed on board the aircraft 16.

As an alternative, not shown, at least one device from among the transmitting device 18 and the one or more receiving device(s) 20 is an electronic device that is external to a secure communication domain within the aircraft 16, this device being for example an device that is external to the aircraft 16, such as an electronic device installed on the ground. This external electronic device is thus then connected to each other device of the communication system 10 via an on-board communication gateway, not shown, implemented on board the aircraft 16 and connected to the avionics communication network 14. The domain that is external to this secure communication domain is also known as open world. The external electronic device thus then belongs to the open world and the communication gateway which is a secure gateway, including therein in particular a system firewall, provides for the interface between the secure domain and the open world.

In the example of FIG. 1, each electronic equipment unit 12 is preferably configured, on the one hand, to transmit data to the one or more other electronic equipment unit/s 12, and on the other hand, to receive data being sent by the one or more other electronic equipment unit/s 12. Each electronic equipment unit 12 thus then preferably comprises the transmitting device 18 and the receiving device 20.

The person skilled in the art will quite obviously understand that an electronic equipment unit 12 which would be designed only to transmit data and not to receive data, would thus then include the transmitting device 18, but not the receiving device. Conversely, an electronic equipment unit 12 that would be designed only to receive data being sent by the one or more other electronic equipment unit/s 12 would thus then include the receiving device 20, but not the transmitting device.

In the example of FIG. 1, each electronic equipment unit 12 comprises an information processing unit 22 formed, for example, of a memory storage 24 associated with a processor 26.

In the example of FIG. 1, a single electronic equipment unit 12 is represented in detail with the various devices and modules that it contains, for the sake of simplification of the diagram.

The avionics communication network 14 comprises at least one network switch 28 and at least one bidirectional link 30, each network switch 28 being connected to one or more electronic equipment unit/s 12 via respective bidirectional links 30. The avionics communication network 14 preferably comprises a plurality of network switches 28, as in the example of FIG. 1, where the avionics communication network 14 comprises two network switches 28 that are connected to each other by means of a bidirectional link 30.

The person skilled in the art will understand that, when the avionics communication network 14 is an Ethernet communication network, each network switch 28 is an Ethernet network switch, and each bidirectional link 30 is a bidirectional Ethernet link.

In optional addition, the avionics communication network 14 is a redundant communication network and comprises at least two independent elementary networks, that are redundant relative to each other. In this case, two electronic equipment units 12, one source equipment unit and one destination equipment unit, communicate via at least two independent elementary networks. In a known manner, the redundancy is achieved frame by frame on each of said networks.

Each electronic transmitting device 18 is configured to transmit at least one data message 35, to the one or more electronic receiving device(s) 20.

Each transmitting device 18 includes a generation module 40 configured to generate a respective data message 35, the message 35 comprising a message header 42 and one or more data packet(s) 44. Each transmitting device 18 includes a transmission module 46 configured to transmit the generated message 35 to the one or more receiving device(s) 20.

Each electronic receiving device 20 is configured to receive data, in particular data containing messages 35, via the communications network. 14. Each receiving device 20 comprises a reception module 50 that is configured to receive via the communications network 14 at least one data containing message 35, and a processing module 52 that is configured to process each received message 35.

In the example of FIG. 1, the generation module 40, the transmission module 46, the reception module 50, and the processing module 52 are each produced in the form of a software application that is executable by the processor 26. The memory storage 24 is then capable of storing a message generation software application configured to generate a respective data message, a transmission software application configured to transmit the generated message 35 to the one or more receiving device(s) 20. The memory storage 24 is also capable of storing a reception software application configured to receive via the communications network 14 at least one data message 35, and a processing software application configured to process each received message 35. The processor 26 of the information processing unit 22 is then capable of executing the generation software application and the transmission software application in the case of the transmitting device 18, or indeed of executing the reception software application and the processing software application in the case of the receiving device 20.

As an alternative, not shown, the generation module 40, the transmission module 46, the reception module 50 and the processing module 52 are each produced in the form of a programmable logic component, such as an FPGA (Field Programmable Gate Array), or indeed in the form of a dedicated integrated circuit, such as an ASIC (Application Specific Integrated Circuit).

A data message 35, or indeed a data frame, is defined as a set of data all being sent in one instance over the communications network 14, from a transmitting device 18 to one or more receiving device(s) 20.

Figure 3:
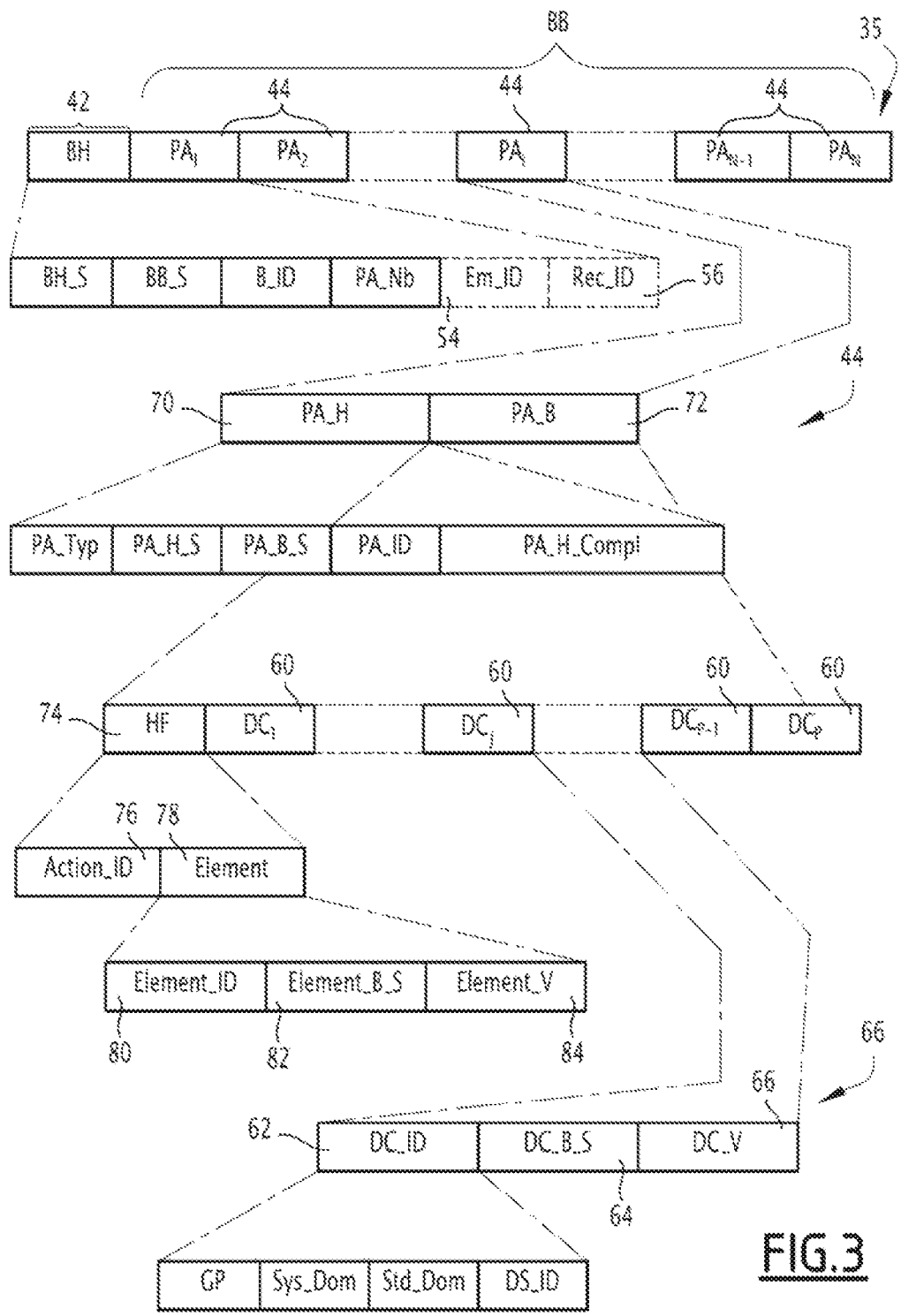
FIG. 3 is a schematic view representing the structure of a data message transmitted by the electronic transmitting device according to the invention.

Each message 35 comprises a respective message header 42, also denoted as BH (Batch Header), and one or more data packet(s) 44, each packet 44 being also denoted as PA (PAcket), as shown in FIG. 3. In FIG. 3, to each packet 44 is associated an index i, having a value comprised between 1 and N, where N is an integer that is greater than or equal to 1 representing the number of packets 44 that form the message 35. The set of N packet(s) 44, also known as batch of packet(s) 44, forms the body of the message 35 and is denoted as BB (Batch Body).

The message header 42 comprises a header size field, denoted as BH_S (Batch Header Size), containing the size of the message header 42, expressed for example in bits or in bytes. This size field BH_S makes it possible to manage the scalability and variability of the content of the header 42.

The message header 42 comprises a body size field, denoted as BB_S (Batch Body Size), containing the size of the message body BB, expressed for example in bytes. Each message body BB preferably is constituted of the set of N packet(s) 44.

The message header 42 also includes a message identification field, denoted as B_ID (Batch IDentifier), containing an identifier for the message 35. This identifier is for example implemented in the form of an integer counter over a predefined number of bits, the counter being incremented by one unit upon each transmission. The number of bits is, for example, equal to 32, which then makes it possible to have a unique identifier for all of the messages 35 transmitted over the avionics communication network 14 over the course of a period of operation of several hours. Thus, even if the identifier for the message 35 is not unique in absolute terms, it is unique over the course of a sufficiently long period of time as it relates to the operational case of the communications system 10.

The message header 42 also includes a packet number field, denoted as PA_Nb (PAcket Number), containing the value of the number N of packet(s) 44 forming the body of the message 35.

In optional addition, the message header 42 includes an identification field for identifying the transmitter 54, also denoted as Em_ID (Emitter IDentifier), containing an identifier of the transmitting device 18 which is unique for all of the electronic devices connected to the avionics communication network 14.

In optional addition, the message header 42 includes an identification field for identifying the receiver 56, also denoted as Rec_ID (Receiver IDentifier), containing an identifier of the receiving device 20 which is unique for all of the electronic devices connected to the avionics communication network 14. The person skilled in the art will understand that, in the case of message transmission in multi-broadcast mode, also called multicast mode, the identification field of the receiver 56 is filled by a predefined value, for example equal to 0 with all the bits of this field at 0.

According to this optional addition, the addition of the identification field of the transmitter 54 and the identification field of the receiver 56 into the message header 42 makes it possible to exchange this information between the transmitting device 18 and the receiving device 20, that is to say between the server and the client, no matter what the position of the latter in relation to the avionics communication network 14, as well as the characteristic features of the avionics network 14 selected.

Each packet 44 comprises one or more data cluster(s) 60, each cluster 60 also being denoted as DC (Data Cluster), as represented in FIG. 3. In FIG. 3, to each cluster 60 is associated an index j, having a value comprised between 0 and P, where P is an integer that is greater than or equal to 0 representing the number of cluster(s) 60 included in the packet 44. Each cluster 60 contains an identifier field 62, also denoted as DC_ID (Data Cluster IDentifier), a size field 64, also denoted as DC_B_S (Data Cluster Body Size), and a payload data field 66, also denoted as DC_V (Data Cluster Value) and containing the payload data of the corresponding cluster 60.

In the example of FIG. 3, each packet 44 comprises a packet header 70, also denoted as PA_H (PAcket Header), and a packet body 72, also denoted as PA_B (PAcket Body), with each packet body 72 then including the one or more data cluster(s) 60. Each packet body 72 in addition includes a functional header 74, also denoted as HF (Header Functional). Each packet body 72 is preferably constituted of the functional header 74 and the set of P cluster(s) 60. It will be understood by the person skilled in the art that, when the above-mentioned index j is equal to 0, the packet body 72 includes only the functional header 74, and does not include any cluster.

Each cluster 60 is adapted to include one or more other data cluster(s) 60, the one or more other data cluster(s) 60 thus then forming the payload data field 66 of said cluster 60. In other words, a cluster 60, referred to as 'parent', is adapted to include one or more other data cluster(s) 60, referred to as 'child', the one or more child clusters thus then forming the payload data field 66 of the parent cluster.

To each cluster 60 is associated a unique avionics functional domain. Each avionics functional domain preferably corresponds to an ATA (Air Transport Association) chapter or to an ATA subchapter. The relevant ATA chapters or subchapters concerned are, for example, the chapter ATA 22 pertaining to Auto Flight, the chapter ATA 22-70 pertaining to the Flight Management System, the chapter ATA 31 pertaining to the Indicating/Recording Systems, the chapter ATA 31-53 pertaining to the Flight Warning System, the chapter ATA 23 pertaining to Communications, the chapter ATA 27 pertaining to Flight Controls, the chapter ATA 28 pertaining to the Fuel System, the chapter ATA 34 pertaining to Navigation.

When the avionics functional domain is identical for the set of P cluster(s) 60 included in the message 35, the message header 42 preferably comprises in addition a functional domain field, not shown, containing an identifier for identifying said avionics functional domain.

When the avionics functional domain is not identical for the set of P cluster(s) 60 included in the message 35, the identifier field 62 for identifying each cluster contains a functional domain field, denoted as Sys_Dom (System Domain) and visible in FIG. 3, the functional domain field Sys_Dom comprising an identifier for identifying the avionics functional domain associated to said cluster 60.

Each cluster 60 is identified in a unique manner for all of the electronic devices 18, 20 connected to the avionics communication network. This uniqueness of the identification of the cluster 60 makes it possible in particular to effectively ensure, at the receiving device 20, the proper interpretation of the content of the cluster 60.

The identifier field 62 for each cluster preferably has a structure that is identical from one cluster 60 to the other. The identifier field 62 is for example encoded with a fixed size, such as one word of 4-bytes. By way of a variant, the identifier field 62 is encoded with a self-adaptive size using one or more most significant bit/s (or high-order bit) in order to indicate its own size. For example, if the first most significant bit is 0, then the encoding is with 4 bytes; if the first most significant bit is 1 and the second most significant bit is 0, then the encoding is with 8 bytes; etc. The size of the identifier field 62 is known to the receiving device 20, which makes it possible for the receiving device 20 to read this identifier field 62, even if its value is unknown.

The identifier field 62 comprises, for example, a field GP (Growth Potential) with one most significant bit to take into account a potential growth in the size of the identifier of the cluster 60. The identifier field 62 then comprises the functional domain field Sys_Dom containing a code that makes it possible to identify the functional domain at the level of the aircraft 16. This identification of the functional domain is typically expressed in terms of ATA chapters or subchapters, by using for example the subsequent 7 bits of the first byte of the field GP.

The identifier field 62 comprises a field Std_Dom (Standard Domain) containing a code that makes it possible to distinguish an identifier for a cluster that is part of the public domain, that is to say shared by all industrial players, from an identifier for a cluster that is part of the private domain, that is to say specific to a given industrial player or an aircraft 16. The size and values of this code are specific to the functional domain concerned.

In addition, the identifier field 62 includes a field DS_ID (Data Set IDentifier) with an identifier of the data contained in the corresponding cluster 60.

The size field 64, also denoted as DC_B_S, is typically in the form of bytes. The size field 64 is for example encoded with a fixed size, such as one word of 4-bytes. By way of a variant, the size field 64 is encoded with a self-adaptive size using one or more most significant bit/s (or high-order bit) in order to indicate its own size. For example, if the first most significant bit is 0, then the size encoding is with one byte and the other 7 bits are used to code a size from 0 to 127. If the first most significant bit is 1 and the second most significant bit is 0, then the encoding is with two bytes, and the other 14 bits are used to encode a size from 0 to 16383. If the first two most significant bits are 1 and the third most significant bit is 0, then the encoding is with three bytes, and the other 21 bits are used to code a size from 0 to 2097151; and so on in a recurrent manner, until reaching the number of bytes necessary.

The person skilled in the art will observe that, when most of the clusters 60 present a size that is less than 127 bytes, this being in order to limit the degree to which the avionics network 14 is actively occupied, it is preferable to use encoding with a self-adaptive size in order to encode the size field 64.

The size field 64 then allows for the receiving device 20 to ignore an unknown or unnecessary cluster 60, and to proceed and continue with its processing of the message 35 by skipping to the subsequent cluster 60, without any disruption in the compatibility between the transmitting device 18 and the receiving device 20.

The size field 64 also makes it possible to cause changing of the definition of the cluster 60 at the transmitting device 18 by adding parameters at the end of the cluster, while also allowing for a receiving device 20 that has no knowledge of these new parameters to ignore them and to continue with the processing of the message 35 by skipping to the subsequent cluster 60, with this thus being without any disruption in the compatibility between the transmitting device 18 and the receiving device 20.

The size field 64 further makes it possible to cause changing of the definition of the cluster 60 at the receiving device 20 by anticipating the addition of parameters at the end of the cluster, while also allowing for a transmitting device 18 that has no knowledge of these new parameters to transmit the previous version of the cluster 60. In this case, the receiving device 20 will only process the current parameters and will apply a penalty to the absent parameters, without any disruption in the compatibility between the transmitting device 18 and the receiving device 20. The penalty is for example selected on a case by case basis, such as an invalidation of said parameters, or indeed the application of a default value, or even the complete invalidation of the concerned cluster 60.

The packet header 70 comprises a type field, denoted as PA_Typ (PAcket Type), each packet 44 preferably presenting a type chosen from the group consisting of: request packet, response packet, and publish packet.

The packet header 70 comprises a header size field, denoted as PA_H_S (PAcket Header Size), containing the size of the packet header 70, expressed for example in bits or in bytes. This size field PA_H_S makes it possible to manage the scalability and variability of the content of the header 70.

The packet header 70 comprises a body size field, denoted as PA_B_S (PAcket Body Size), containing the size of the packet body 72, also denoted as PA_B, this size being expressed for example in bytes.

The packet header 70 also includes a packet identification field, denoted as PA_ID (PAcket IDentifier), containing an identifier of the packet 44 which is unique to the corresponding message 42.

The pair formed of the identification field of the message B_ID and the identification field of the packet PA_ID then makes it possible to identify in a unique manner the given packet 44 from among all of the packets 44 transmitted over the avionics communication network 14 over the course of a time period that is sufficiently long in relation to the operation of the communications system 10. Indeed, because of the identification field of the message B_ID and the identification field of the packet PA_ID, even if the identification is not unique in absolute terms, it is unique over the course of a period of time that is fairly significantly longer than a possible maximum time between the emission of a request and the reception of the one or more associated response/s, the identification being unique typically over the course of a time period of several minutes.

In optional addition, the packet header 70 includes a complement field, denoted as PA_H_Compl (PAcket Header Complement), comprising certain additional fields, the nature of which will vary depending on the type of packet. For packets 44 of the publish type, the additional field is for example a version field making it possible to indicate a minimal condition for making available the required data. For packets 44 of the request type, the additional field is for example a session identifier. For packets 44 of the response type, the additional fields are for example a request identification field making it possible to perform the correlation thereof with the request and the version field.

The functional header 74 defines a communication grammar between the transmitting device 18 and the receiving device 20. The functional header 74, also denoted as HF, includes an identification field for the type of action 76, also denoted as Action_ID (Action IDentifier), containing an identifier of an action type requested by the transmitting device 18 or by the receiving device 20. The type of action is for example a lookup request, a modification request, a computation-calculation request, a request to create, an activation request, or indeed a request to publish. The person skilled in the art will thus then understand that, when the type of action is a request, the latter corresponds for example to an avionics command, this request then being contained in a message transmitted to the device which, from the transmitting device 18 and the receiving device 20 is an avionic device, in order for the latter to carry out the avionics command associated with the request. When the generated message is sent to a device which, from the transmitting device 18 and the receiving device 20, is not an avionics device, the associated action, contained in the action type identification field Action_ID, is typically a publish request.

The functional header 74 in addition includes an element field 78, also denoted as Element, containing the element to which the action requested by the transmitting device 18 or the receiving device 20 pertains.

The element field 78 presents a structure that is identical to that of the cluster 60, previously described above, and thus then contains an identifier field 80, also denoted as Element_ID (Element IDentifier), a size field 82, also denoted as Element_B_S (Element Body Size), and a payload data field 84, also denoted as Element_V (Element Value) and containing the payload data of the element.

The structure and the encoding of the identifier field 80, denoted as Element_ID, are then identical to those previously described for the identifier field 62, denoted as DC_ID. In an analogous manner, the structure and the encoding of the size field 82, denoted as Element_B_S, are then identical to those described previously for the size field 64, denoted as DC_B_S.

Figure 2:
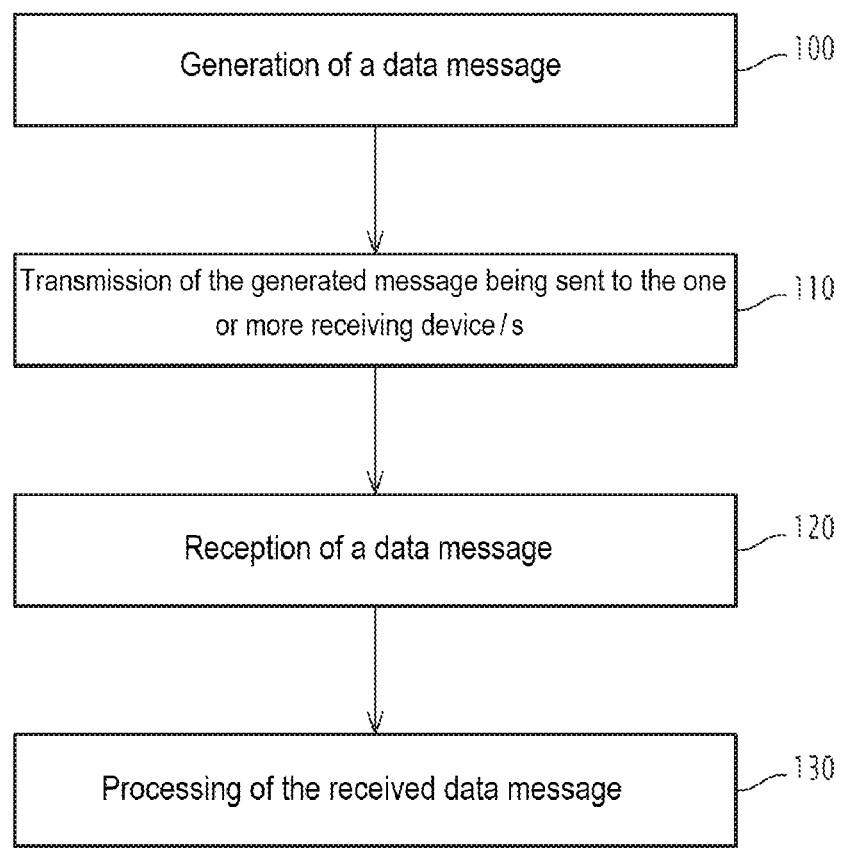
FIG. 2 is a flowchart of a data transmission process within the communication system of FIG. 1, with the implementation of a transmission method for transmitting a data message according to the invention, and then of a message receiving method for receiving the transmitted message.

The operation of the communications system 10 according to the invention will now be explained in view of FIG. 2 representing a flowchart of a transmission method for transmitting data within the communications system 10 from a transmitting device 18 to one or more receiving device(s) 20 via the avionics communication network 14.

During an initial step 100, the transmitting device 18 generates, via its generation module 40, one or more data messages 35, each message 35 comprising a message header 42 and one or more data packet(s) 44.

According to the invention, each packet 44 comprises one or more data cluster(s) 60, each parent cluster 60 being adapted to include one or more other child clusters 60, with the one or more other child clusters 60 thus then forming the payload data field 66 of the parent cluster 60.

The transmitting device 18 then emits, during the subsequent step 110 and via the transmission module 46 thereof, the one or more data messages 35 generated over the avionics communication network 14 to the one or more receiving device(s) 20.

During the step 120, each recipient receiving device 20 receives, via the avionics communication network 14 and the reception module 50 thereof, the one or more data message(s) 35 that has been sent thereto.

Each receiving device 20 that has received at least one message 35 then processes, during the subsequent step 130 and via its processing module 52, the one or more received message(s) 35, this occurring while having knowledge of the structuring of each message 35, as has been described in the example of FIG. 3, and in particular of the possibility for a parent cluster 60 to include one or more other child clusters 60.

In addition, for the transmission of data between the transmitting device 18 and the one or more receiving device(s) 20, various different transmission patterns are envisaged.

One multi-cast publish pattern is provided for a generic transmission of data, from one transmitting device 18 to all of the receiving devices 20 connected to the avionics communication network 14. This transmission in multi-cast mode is carried out over an event, in a periodic manner, or even upon request. For example, in the case of an interface between a flight management system and a visual display, the emission in multi-cast mode is to be triggered over an event from the transmitting device 18 in order to maintain an updated display, and is optionally supplemented by a periodic emission in order to monitor an eventual loss of transmission.

A unicast pattern is provided for a notification from a transmitting device 18 to a receiving device 20, which pattern is also referred to as a notification pattern. This makes it possible for a transmitting device 18 to send information and data in a unitary, that is to say non-recurrent manner, to a particular receiving device 20. The notification pattern makes it possible to limit the use of the avionic communications network 14 to the strictly necessary degree.

A unicast pattern is provided for a request from a receiving device 20 to a transmitting device 18, this pattern also being known as a request pattern. In this case, the request will be followed by an acknowledgment from the transmitting device 18 in order to inform the receiving device 20 of the taking into account of its request.

A bidirectional unicast subscription/response pattern is a combination of a request pattern, namely for a subscription request, followed by the acknowledgment thereof which will automatically trigger, in the transmitting device 18, a cluster notification pattern 60 to which the receiving device 20 is subscribed. The emission of the subscription is performed over an event, in a periodic manner, or even upon request. For example, in the case of an interface between a flight management system and a visual display, the emission of the subscription is performed over an event from the transmitting device 18, following the reception of the subscription request and then upon a change in the context of the transmitting device 18, this being in order to maintain a good level of responsiveness. In this example, the emission of the subscription is optionally supplemented by a periodic emission in order to monitor an eventual loss of transmission.

Thus, the transmitting device 18 according to the invention makes it possible to generate a data message 35 with a cluster 60 offering a hierarchical structure, in the sense that a parent cluster 60 is adapted to include one or more other child clusters 60, the one or more other child clusters 60 thus then forming the payload data field 66 of the parent cluster 60. The clusters 60 then are not only groupings of parameters, but are also adapted to group other clusters 60. By way of example, in the case of a flight management system, the constraints associated with one branch will be grouped together within one cluster 60 associated to one point of the flight plan which will itself be one of the clusters 60 associated to one portion of the flight plan, which will itself be one of the clusters 60 associated to the full flight plan.

This hierarchical structuring thus makes it possible to offer scalability and flexibility, without generating any incompatibility with the receiving device 20. For example, the transmitting device 18 can introduce into its transmitted messages 35 a necessary hierarchical structure intended for one of its receiving devices 20, while other receiving devices 20 that do not know this structure would be able to skip it in a block, during the processing of the received message.

In addition, in the case of a transmission within a given aircraft 16, it is easy through configuration to adapt the emissions as per needs by putting in predefined message structures only the necessary clusters 60. By way of example, if a flight management system incorporates an on-board capability for searching and rescue, but which is not used in a given 16 aircraft, it is, with the structuring of the message 35 according to the invention, much easier to not transmit the data relating to this capability, including all its child data clusters, and thereby reduce the degree to which the avionics communication network 14 is actively occupied.

In addition, in order to ensure better functional coherence between clusters 60, to a cluster 60 is associated a reference indicator that is already found in other clusters 60. For example, in the case of a flight management system, a flight plan point identifier is included in a plurality of distinct clusters 60.

In addition, the structuring of the message 35 according to the invention, as represented in FIG. 3, makes it possible to offer an effective communication interface between the transmitting device 18 and the receiving device 20. In particular, it makes it possible, by virtue of the structure of the cluster 60 and via the generation module 40, to perform a grouping of functional data into clusters 60 according to a plurality of criteria.

A first criterion is, for example, a functional coherence of the cluster 60. According to this first criterion, the data of the same given cluster 60 then relate to the same given function or sub-function of the transmitting device 18, and their values correspond to the same context of the transmitting device 18. For example, for a flight management system, the data relating to the departure procedure of a flight plan will be grouped together as well as those relating to the arrival procedure.

A second criterion is, for example, the isolation of scalability in the clusters 60. The parameters of a same kind, subject to evolutionary change, are grouped together in order to allow a consistent coherent increment. For example, for a flight management system, the data related to prediction will be grouped together in order to make possible future evolutionary changes, without ending up with a patchwork of parameters. In similar manner, a structure of variable size will be isolated in order to allow for its change, without impacting the processing of other parameters.

A third criterion is, for example, an isolation of optional data within a given cluster 60, in order to be able to effectively manage the presence or absence thereof. For example, for a flight management system, the altitude and/or speed constraints that are likely to be associated to a point of the flight plan will constitute a cluster 60 that will be present only if this type of constraint/s is defined on the point in question.

A fourth criterion is, for example, a specialization of clusters 60 as per the needs. For example, for the first level displays corresponding to a pattern of publishing in multi-cast mode, the cluster 60 will contain only the main parameters, this being so essentially in order to limit the consumption of the resources of the avionics communication network 14. On the other hand, for a detailed display corresponding to a subscription pattern, the cluster 60 of the same functional element will include the detailed parameters, even if they are not all required by a given receiving device 20, this being so in order to facilitate enhanced versatility. Indeed, the subscription mechanism allows for a receiving device 20 to choose a particular set of clusters 60, the consumption of resources of the avionics communication network 14 then being less significant.

It may thus be conceived that the transmission method and the electronic transmitting device 18 according to the invention make it possible to adapt more easily to the various different types of data to be exchanged on board the aircraft 16.

The invention claimed is:

1. A transmission method for transmitting a data message to at least one receiving device, the method being implemented by an electronic transmitting device, the transmitting device and the at least one receiving device being connected via an avionics network on board an aircraft, at least one device from a portion of the transmitting device and the at least one receiving device being an avionics device on board the aircraft; the method including:
the generation of a data message, the message comprising a message header and one or more data packet(s); and
the transmission of the generated message to the at least one receiving device;
wherein each packet comprises one or more data cluster(s), each cluster containing an identifier field including a unique identifier of the cluster, a size field including a size of the cluster, a payload data field, and each cluster being adapted to include one or more other data cluster(s), the one or more other data cluster(s) then forming the payload data field of said cluster and, wherein said identifier field further includes an identifier of an avionics functional domain, and wherein to each cluster is associated a single avionics functional domain.

2. The method according to claim 1, wherein each avionics functional domain corresponds to an Air Transport Association chapter or an Air Transport Association subchapter.

3. The method according to claim 1, wherein, when the avionics functional domain is identical for the set of the cluster(s) included in the message, the message header comprises a functional domain field containing an identifier of the avionics functional domain.

4. The method according to claim 1, wherein, when the avionics functional domain is not identical for the set of the cluster(s) included in the message, the identifier field of each cluster contains an identifier of the avionics functional domain associated to said cluster.

5. The method according to claim 1, wherein each cluster is identified in a unique manner for all of the electronic devices connected to the avionics network.

6. The method according to claim 5, wherein the identifier field of each cluster has an identical structure from one cluster to another.

7. The method according to claim 1, wherein the message header includes a transmitter identification field containing an identifier of the transmitting device which is unique for all the electronic devices connected to the avionics network.

8. The method according to claim 1, wherein the message header includes a receiver identification field containing an identifier of the at least one receiving device which is unique for all of the electronic devices connected to the avionics network.

9. The method according to claim 1, wherein each packet includes a packet header and a packet body, with each packet body then comprising the one or more data cluster(s), each packet presenting a type chosen from among the group consisting of:
request packet, response packet, and publish packet.

10. A non-transitory computer-readable medium including a computer program that comprises the software instructions which, when executed by a computer, implement a method according to claim 1.

11. An electronic transmitting device configured to transmit a data message to at least one receiving device, the transmitting device and the at least one receiving device being able to be connected via an avionics network on board an aircraft, at least one device from the transmitting device and the at least one receiving device being an avionics device intended to be on board the aircraft; the electronic transmitting device comprising:
a generation module configured to generate a data message, the message comprising a message header and one or more data packet(s); and
a transmission module configured to transmit the generated message to the at least one receiving device,
wherein each packet comprises one or more data cluster(s), each cluster containing an identifier field including a unique identifier of the cluster, a size field including a size of the cluster, and a payload data field, and each cluster being adapted to include one or more other data cluster(s), the one or more other data cluster(s) then forming the payload data field of said cluster, wherein said identifier field further includes an identifier of an avionics functional domain, and wherein to each cluster is associated a single avionics functional domain.

* * * * *